(12) United States Patent
Brauer

(10) Patent No.: US 10,713,534 B2
(45) Date of Patent: Jul. 14, 2020

(54) TRAINING A LEARNING BASED DEFECT CLASSIFIER

(71) Applicant: KLA-Tencor Corporation, Milpitas, CA (US)

(72) Inventor: Bjorn Brauer, Beaverton, OR (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 16/109,631

(22) Filed: Aug. 22, 2018

(65) Prior Publication Data
US 2019/0073566 A1 Mar. 7, 2019

Related U.S. Application Data

(60) Provisional application No. 62/553,351, filed on Sep. 1, 2017.

(51) Int. Cl.
G06K 9/00 (2006.01)
H01L 21/00 (2006.01)
G06K 9/62 (2006.01)
G06T 7/00 (2017.01)

(52) U.S. Cl.
CPC ......... *G06K 9/6262* (2013.01); *G06K 9/6274* (2013.01); *G06T 7/0002* (2013.01); *G06K 2209/19* (2013.01); *G06T 2207/10061* (2013.01); *G06T 2207/20081* (2013.01); *G06T 2207/20084* (2013.01); *G06T 2207/30148* (2013.01)

(58) Field of Classification Search
USPC ....... 382/100, 103, 108, 141, 144, 149, 156, 382/168, 173, 181, 219–220, 254, 382/275–276, 289, 305, 321; 438/7, 18, 438/69, 77
See application file for complete search history.

(56) References Cited

U.S. PATENT DOCUMENTS

| | | | |
|---|---|---|---|
| 7,570,796 B2 | 8/2009 | Zafar et al. | |
| 7,583,832 B2 | 9/2009 | Okuda et al. | |
| 7,676,077 B2 | 3/2010 | Kulkarni et al. | |
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |

(Continued)

OTHER PUBLICATIONS

International Search Report and Written Opinion for PCT/US2018/048042 dated Dec. 13, 2018.

(Continued)

*Primary Examiner* — Seyed H Azarian
(74) *Attorney, Agent, or Firm* — Ann Marie Mewherter

(57) ABSTRACT

Methods and systems for training a learning based defect classifier are provided. One method includes training a learning based defect classifier with a training set of defects that includes identified defects of interest (DOIs) and identified nuisances. The DOIs and nuisances in the training set include DOIs and nuisances identified on at least one training wafer and at least one inspection wafer. The at least one training wafer is known to have an abnormally high defectivity and the at least one inspection wafer is expected to have normal defectivity.

52 Claims, 4 Drawing Sheets

(56) References Cited

U.S. PATENT DOCUMENTS

| | | | |
|---|---|---|---|
| 2011/0007961 A1* | 1/2011 | Iwanaga | G01N 21/8851 382/149 |
| 2015/0254832 A1* | 9/2015 | Plihal | G06T 7/001 382/149 |
| 2015/0262038 A1* | 9/2015 | Konuru | G06T 7/0004 382/149 |
| 2016/0258879 A1 | 9/2016 | Liang et al. | |
| 2017/0082555 A1 | 3/2017 | He et al. | |
| 2017/0140524 A1 | 5/2017 | Karsenti et al. | |
| 2017/0147909 A1 | 5/2017 | Izumi | |
| 2017/0148226 A1 | 5/2017 | Zhang et al. | |
| 2017/0193400 A1 | 7/2017 | Bhaskar et al. | |
| 2017/0193680 A1* | 7/2017 | Zhang | G01N 21/9501 |
| 2017/0194126 A1 | 7/2017 | Bhaskar et al. | |
| 2017/0200260 A1* | 7/2017 | Bhaskar | G06K 9/6256 |
| 2017/0200264 A1 | 7/2017 | Park et al. | |
| 2017/0200265 A1 | 7/2017 | Bhaskar et al. | |
| 2017/0345140 A1 | 11/2017 | Zhang et al. | |

OTHER PUBLICATIONS

Hand et al., "Principles of Data Mining (Adaptive Computation and Machine Learning)," MIT Press, Aug. 1, 2001, 578 pages.

He et al., "Deep Residual Learning for Image Recognition," arXiv:1512.03385v1, Dec. 10, 2015, 12 pages.

Jebara, "Discriminative, Generative, and Imitative Learning," MIT Thesis, Feb. 2002, 212 pages.

Krizhevsky et al., "ImageNet Classification with Deep Convolutional Neural Networks," NIPS, Jan. 2012, 9 pages.

Simonyan et al., "Very Deep Convolutional Networks for Large-Scale Image Recognition," presented at International Conference on Learning Representations (ICLR) 2015, Apr. 10, 2015, 14 pages.

Sugiyama, "Introduction to Statistical Machine Learning," Morgan Kaufmann, Oct. 9, 2015, 534 pages.

Szegedy et al., "Going Deeper with Convolutions," 2015 IEEE Conference on Computer Vision and Pattern Recognition (CVPR), Jun. 2015, 9 pages.

U.S. Appl. No. 15/697,426, filed Sep. 6, 2017 by He et al. (submitted as U.S. Patent Application Publication No. 2019/0073568 published Mar. 7, 2019).

* cited by examiner

TRAINING A LEARNING BASED DEFECT CLASSIFIER

BACKGROUND OF THE INVENTION

1. Field of the Invention

This invention generally relates to methods and systems for training a learning based defect classifier.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

As design rules shrink, however, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically.

Relatively high nuisance rates are a common problem and prevent running hot enough (i.e., into the noise floor) to find substantially small defects. Since simply not detecting nuisances is often not a possibility, the success of inspection processes can often depend on the ability to find the right nuisance suppression technique for the inspection processes. Nuisance suppression techniques that are performed on defects detected on wafers are often referred to as nuisance filters since they are designed to filter nuisances out of the inspection results. Finding suitable parameters for the nuisance filters requires determining how nuisances and actual defects (or defects of interest) are different in the output generated by the inspection system or the attributes of the detected defects that can be determined from the output. As such, the nuisance filter parameters may be set up by using an inspection system to generate output for both nuisances and actual defects (or defects of interest) and determining how the output or attributes determined therefrom are different for the nuisances compared to the actual defects (or defects of interest).

One significant challenge in such approaches is, however, correctly identifying nuisances and actual defects on a wafer and a variety of nuisances and actual defects that represent variations in the detected defects that may be found from wafer-to-wafer. If the nuisance filter is set up using nuisances and actual defects that do not adequately represent those that will actually be detected on wafers, the nuisance filter will be effectively useless.

Accordingly, it would be advantageous to develop systems and/or methods for training a learning based defect classifier that do not have one or more of the disadvantages described above.

SUMMARY OF THE INVENTION

The following description of various embodiments is not to be construed in any way as limiting the subject matter of the appended claims.

One embodiment relates to a system configured to train a learning based defect classifier. The system includes an inspection subsystem that includes at least an energy source and a detector. The energy source is configured to generate energy that is directed to wafers. The detector is configured to detect energy from the wafers and to generate output responsive to the detected energy. The wafers include at least one training wafer known to have an abnormally high defectivity and at least one inspection wafer expected to have normal defectivity.

The system also includes one or more computer subsystems configured for detecting defects on the at least one training wafer and the at least one inspection wafer by applying a defect detection method to the output generated for the at least one training wafer and the at least one inspection wafer, respectively. The one or more computer subsystems are also configured for identifying defects of interest (DOIs) on the at least one training wafer and the at least one inspection wafer by determining which of the defects detected on the at least one training wafer and the at least one inspection wafer, respectively, are the DOIs. In addition, the one or more computer subsystems are configured for identifying nuisances on the at least one training wafer and the at least one inspection wafer by determining which of the defects detected on the at least one training wafer and the at least one inspection wafer, respectively, are the nuisances. The one or more computer subsystems are further configured for generating a training set of defects including the identified DOIs and the identified nuisances by combining information for the identified DOIs and the identified nuisances. The one or more computer subsystems are also configured for training a learning based defect classifier with the training set of defects. The system may be further configured as described herein.

Another embodiment relates to a computer-implemented method for training a learning based defect classifier. The method includes detecting defects on at least one training wafer and at least one inspection wafer by applying a defect detection method to output generated for the at least one training wafer and the at least one inspection wafer, respectively, by a detector of an inspection subsystem. The at least one training wafer is known to have an abnormally high defectivity, and the at least one inspection wafer is expected to have normal defectivity. The inspection subsystem is configured as described further herein. The method also includes the identifying defects of interest, identifying nuisances, generating a training set of defects, and training a learning based defect classifier steps described further above. The steps are performed by one or more computer subsystems coupled to the inspection subsystem.

Each of the steps of the method described above may be further performed as described further herein. In addition, the method described above may include any other step(s) of any other method(s) described herein. Furthermore, the method described above may be performed by any of the systems described herein.

An additional embodiment relates to a non-transitory computer-readable medium storing program instructions executable on a computer system for performing a computer-implemented method for training a learning based defect classifier. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Other objects and advantages of the invention will become apparent upon reading the following detailed description and upon reference to the accompanying drawings in which.

Figure 1:
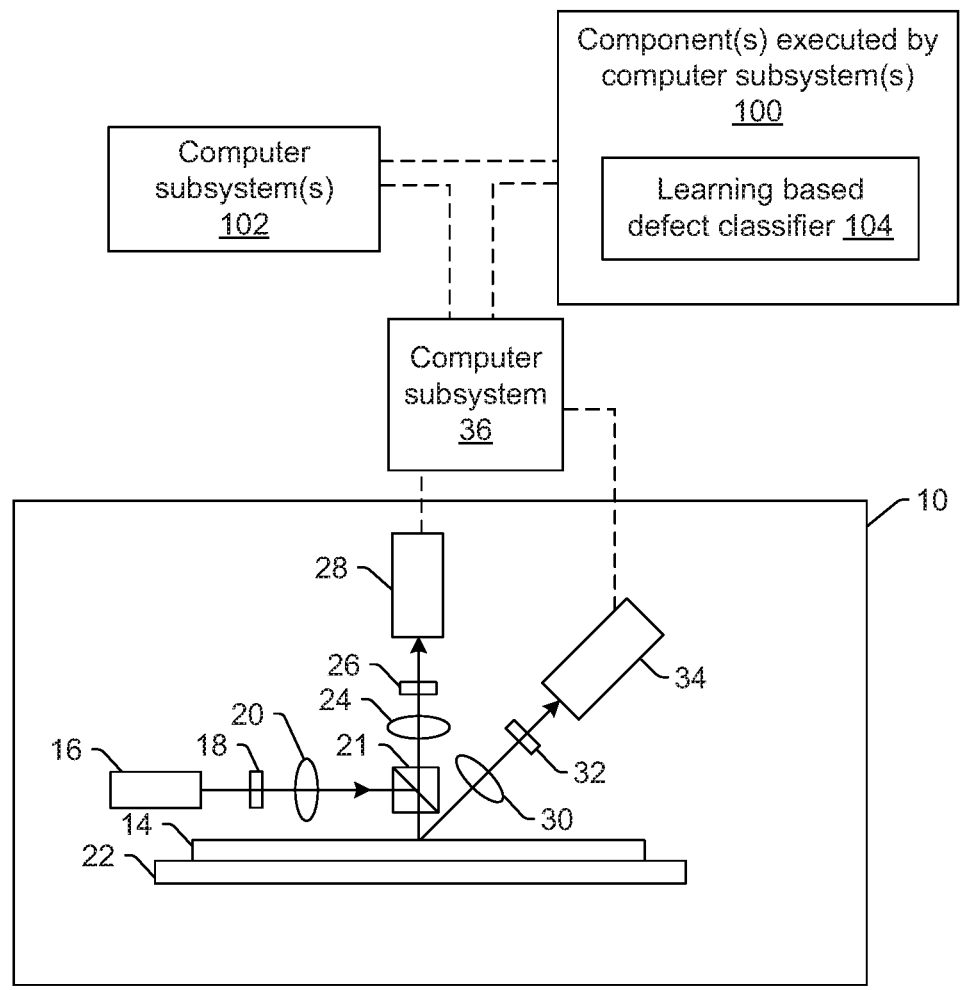
FIGS. 1 and 2 are schematic diagrams illustrating a side view of an embodiment of a system configured as described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to train a learning based defect classifier. As described further herein, the embodiments are configured for training a learning based defect classifier using defects detected on different types of wafers, and the detected defects include both defects of interest (DOIs) and nuisances. DOIs and nuisances detected on different types of wafers have not previously been used for training a learning based defect classifier. However, using DOIs and nuisances detected on multiple types of wafers to train a learning based defect classifier as described herein provides a number of advantages also described herein over previously used methods and systems for training a learning based defect classifier.

One embodiment of such a system is shown in FIG. 1. The system includes an inspection subsystem that includes at least an energy source and a detector. The energy source is configured to generate energy that is directed to wafers. The detector is configured to detect energy from the wafers and to generate output responsive to the detected energy. The wafers include wafers described further herein.

In one embodiment, the inspection subsystem is configured as an optical inspection subsystem. For example, in the embodiment of the system shown in FIG. 1, inspection subsystem 10 includes an illumination subsystem configured to direct light to wafer 14. The illumination subsystem includes at least one light source. For example, as shown in FIG. 1, the illumination subsystem includes light source 16. In one embodiment, the illumination subsystem is configured to direct the light to the wafer at one or more angles of incidence, which may include one or more oblique angles and/or one or more normal angles. For example, as shown in FIG. 1, light from light source 16 is directed through optical element 18 and then lens 20 to beam splitter 21, which directs the light to wafer 14 at a normal angle of incidence. The angle of incidence may include any suitable angle of incidence, which may vary depending on, for instance, characteristics of the wafer and the defects to be detected on the wafer.

The illumination subsystem may be configured to direct the light to the wafer at different angles of incidence at different times. For example, the inspection subsystem may be configured to alter one or more characteristics of one or more elements of the illumination subsystem such that the light can be directed to the wafer at an angle of incidence that is different than that shown in FIG. 1. In one such example, the inspection subsystem may be configured to move light source 16, optical element 18, and lens 20 such that the light is directed to the wafer at a different angle of incidence.

In some instances, the inspection subsystem may be configured to direct light to the wafer at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the wafer at the same time as the other light, one or more characteristics (e.g., wavelength, polarization, etc.) of the light directed to the wafer at different angles of incidence may be different such that light resulting from illumination of the wafer at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the wafer. Multiple illumination channels may be configured to direct light to the wafer at the same time or at different times (e.g., when different illumination channels are used to sequentially illuminate the wafer). In another instance, the same illumination channel may be configured to direct light to the wafer with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the wafer at different times. The illumination subsystem may have any other suitable configuration known in the art for directing light having different or the same characteristics to the wafer at different or the same angles of incidence sequentially or simultaneously.

In one embodiment, light source 16 may include a broadband plasma (BBP) light source. In this manner, the light generated by the light source and directed to the wafer may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, it is to be understood that, in practice, lens 20 may include a number of refractive and/or reflective optical elements that in combination focus the light from the optical element to the wafer. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to cause the light to be scanned over the wafer. For example, the inspection subsystem may include stage 22 on which wafer 14 is disposed during inspection. The scanning subsystem may include any suitable mechanical and/or robotic assembly (that includes stage 22) that can be configured to move the wafer such that the light can be scanned over the wafer. In addition, or alternatively, the inspection subsystem may be configured such that one or more optical elements of the inspection subsystem perform some scanning of the light over the wafer. The light may be scanned over the wafer in any suitable fashion.

The inspection subsystem further includes one or more detection channels. At least one of the one or more detection channels includes a detector configured to detect light from the wafer due to illumination of the wafer by the inspection subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the wafer. However, two or more of the detection channels may be configured to detect the same type of light from the wafer (e.g., specularly reflected light). Although FIG. 1 shows an embodiment of the inspection subsystem that includes two detection channels, the inspection subsystem may include a different number of detection channels (e.g., only one detection channel or two or more detection channels). Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection subsystem may be signals or data, but not image signals or image data. In such instances, a computer subsystem such as computer subsystem 36 of the system may be configured to generate images of the wafer from the non-imaging output of the detectors. However, in other instances, the detectors may be configured as imaging detectors that are configured to generate imaging signals or image data. Therefore, the system may be configured to generate the output described herein in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the system as is normally performed when designing a commercial inspection system. In addition, the systems described herein may be implemented using an existing inspection system (e.g., by adding functionality described herein to an existing inspection system) such as the 29xx and 39xx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 of the system may be coupled to the detectors of the inspection subsystem in any suitable manner (e.g., via one or more transmission media, which may include "wired" and/or "wireless" transmission media) such that the computer subsystem can receive the output generated by the detectors during scanning of the wafer. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Figure 2:
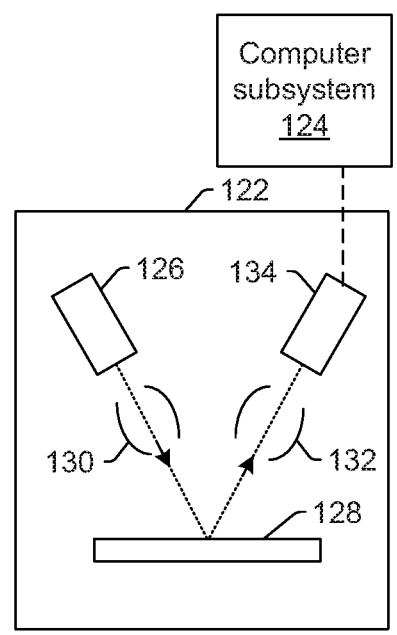

In another embodiment, the inspection subsystem is configured as an electron beam inspection subsystem. In one such embodiment shown in FIG. 2, the electron beam inspection subsystem includes electron column 122, which is coupled to computer subsystem 124. As also shown in FIG. 2, the electron column includes electron beam source 126 configured to generate electrons that are focused to wafer 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the wafer (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the wafer at an oblique angle of incidence and are scattered from the wafer at another oblique angle, it is to be understood that the electron beam may be directed to and scattered from the wafer at any suitable angles. In addition, the electron beam based tool may be configured to use multiple modes to generate images of the wafer (e.g., with different illumination angles, collection angles, etc.). The multiple modes of the electron beam based tool may be different in any image generation parameters of the tool.

Computer subsystem 124 may be coupled to detector 134 as described above. The detector may detect electrons returned from the surface of the wafer thereby forming electron beam images of the wafer. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the electron beam inspection subsystem shown in FIG. 2 may be further configured as described herein.

It is noted that FIG. 2 is provided herein to generally illustrate a configuration of an electron beam inspection subsystem that may be included in the embodiments described herein. As with the optical inspection subsystem described above, the electron beam inspection subsystem described herein may be altered to optimize the performance of the electron beam inspection subsystem as is normally performed when designing a commercial inspection system. In addition, the systems described herein may be implemented using an existing electron beam inspection system (e.g., by adding functionality described herein to an existing electron beam inspection system). For some such systems, the methods described herein may be provided as optional functionality of the system (e.g., in addition to other functionality of the system). Alternatively, the system described herein may be designed "from scratch" to provide a completely new system.

Although the inspection subsystem is described above as being an optical or electron inspection subsystem, the inspection subsystem may be an ion beam inspection subsystem. Such an inspection subsystem may be configured as shown in FIG. 2 except that the electron beam source may be replaced with any suitable ion beam source known in the art. In addition, the inspection subsystem may be any other suitable ion beam tool such as those included in commercially available focused ion beam (FIB) systems, helium ion microscopy (HIM) systems, and secondary ion mass spectroscopy (SIMS) systems.

As noted above, the inspection subsystem may be configured for directing energy (e.g., light, electrons) to and/or scanning energy over a physical version of the wafer thereby generating actual (i.e., not simulated) output and/or images for the physical version of the wafer. In this manner, the inspection subsystem may be configured as an "actual" tool, rather than a "virtual" tool. Computer subsystem(s) 102 shown in FIG. 1 may, however, include one or more "virtual" systems (not shown) that are configured for performing one or more functions using at least some of the actual optical output or images and/or the actual electron beam output or images generated for the wafer, which may include any of the one or more functions described further herein.

The one or more virtual systems are not capable of having the wafer disposed therein. In particular, the virtual system(s) are not part of inspection subsystem 10 or electron column 122 and do not have any capability for handling the physical version of the wafer. In other words, in a virtual system, the output of its one or more "detectors" may be output that was previously generated by one or more detectors of an actual inspection subsystem and that is stored in the virtual system, and during the "imaging and/or scanning," the virtual system may replay the stored output as though the wafer is being imaged and/or scanned. In this manner, imaging and/or scanning the wafer with a virtual system may appear to be the same as though a physical wafer is being imaged and/or scanned with an actual system, while, in reality, the "imaging and/or scanning" involves simply replaying output for the wafer in the same manner as the wafer may be imaged and/or scanned.

Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents.

The inspection subsystems described herein may be configured to generate output, e.g., images, of the wafer with multiple modes. In general, a "mode" is defined by the values of parameters of the inspection subsystem used for generating images of a wafer or the output used to generate images of the wafer. Therefore, modes that are different may be different in the values for at least one of the parameters of the inspection subsystem. In this manner, in some embodiments, the output includes images generated by the inspection subsystem with two or more different values of a parameter of the inspection subsystem. For example, in one embodiment of an optical inspection subsystem, at least one of the multiple modes uses at least one wavelength of light for illumination that is different from at least one wavelength of the light for illumination used for at least one other of the multiple modes. The modes may be different in the illumination wavelength as described further herein (e.g., by using different light sources, different spectral filters, etc.) for different modes. In another embodiment, at least one of the multiple modes uses an illumination channel of the inspection subsystem that is different from an illumination channel of the inspection subsystem used for at least one other of the multiple modes. For example, as noted above, the inspection subsystem may include more than one illumination channel. As such, different illumination channels may be used for different modes.

In a similar manner, the output generated by the electron beam inspection subsystem may include output, e.g., images, generated by the electron beam inspection subsystem with two or more different values of a parameter of the electron beam inspection subsystem. The multiple modes of the electron beam inspection subsystem can be defined by the values of parameters of the electron beam inspection subsystem used for generating output and/or images for a wafer. Therefore, modes that are different may be different in the values for at least one of the electron beam parameters of the electron beam inspection subsystem. For example, in one embodiment of an electron beam inspection subsystem, at least one of the multiple modes uses at least one angle of incidence for illumination that is different from at least one angle of incidence of the illumination used for at least one other of the multiple modes.

The wafers include at least one training wafer known to have an abnormally high defectivity and at least one inspection wafer expected to have normal defectivity. Therefore, the wafers that are scanned by the inspection subsystem and on which the defects are detected include different types of wafers: training wafer(s) having an abnormally high defectivity and inspection wafer(s) expected to have normal defectivity.

"Abnormally high defectivity" as that phrase is used herein is defined as a defectivity that is significantly higher than that which is typically found on a wafer processed in an optimized or best known method. In other words, a training wafer that is known to have an abnormally high defectivity is not generally going to be a production wafer that has been created using a production worthy fabrication process. The "abnormally high defectivity" can be known (established or determined) on a training wafer by intentionally creating the abnormally high defectivity on the training wafer in a number of different manners as described herein. In this manner, the "abnormally high defectivity" training wafer(s) may be created specifically for the purposes described herein. Alternatively, the training wafer(s) that is or are known to have "abnormally high defectivity" may be wafer(s) whose defectivity has been established by some other method or system as being abnormally high. In this manner, the training wafer(s) may not need to be created especially for the purposes described herein if there are existing wafer(s) that is or are known to have abnormally high defectivity.

In contrast, "expected to have normal defectivity" as that phrase is used herein is meant to indicate a wafer that has been created using a fabrication process (e.g., a production ready fabrication process) known to produce a minimum or normal amount of defectivity on wafers. For example, the fabrication process used to create the inspection wafer(s) may be a best known fabrication process or a fabrication process whose parameters have already been optimized to produce wafers having the desired characteristics (e.g., as is done to create or find a production worthy process).

The inspection wafer(s) are referred to as such herein since they are the wafers that will be inspected using the inspection recipe for which the learning based defect classifier is being trained. In this manner, the inspection wafer(s) may be wafer(s) that have been processed as they will normally be prior to inspection. In other words, the inspection wafer(s) preferably have formed thereon the layer of the wafer that will be inspected using the inspection recipe and possibly all other layer(s) formed on the wafer prior to the layer that will be inspected.

Other than having substantially different defectivity, the training wafer(s) and the inspection wafer(s) may be of the same type and may have been processed in the same fabrication process(es) (except that the training wafer(s) may be modified as described further herein in a manner that the inspection wafer(s) are not to produce the training wafer(s)). For example, the same fabrication processes may have been performed on both the training wafer(s) and the inspection wafer(s) except that the processes have generated different defectivity on the different types of wafers and/or the training wafer(s) are modified subsequent to the processing. The training wafer(s) and the inspection wafer(s) may therefore be of the same type and have the same wafer layers formed thereon prior to any modifications to the training wafer(s) to produce the abnormally high defectivity. In this manner, the training wafer(s) and the inspection wafer(s) in combination can represent the wafer-to-wafer variation in defectivity that may be found on wafers after the same fabrication process(es) are performed thereon or on the same wafer layer formed thereon, which is advantageous as described further herein.

In one embodiment, the at least one training wafer and the at least one inspection wafer are formed using the same one or more fabrication processes except that the same one or more fabrication processes have produced the abnormally high defectivity on the at least one training wafer. For example, as described above, the at least one training wafer and the at least one inspection wafer may have had the same fabrication processes performed thereon such that the training wafer(s) and the inspection wafer(s) are of the same type and have the same wafer layer(s) formed thereon. If one of the wafers produced in this manner is found to have an abnormally high defectivity, that wafer can be used as the at least one training wafer. In this manner, there may be more than one inspection wafer, upon inspection of the inspection wafers, one of them may be found to have an abnormally high defectivity and then that one wafer may be used as the at least one training wafer. As such, although it is true that the embodiments described herein use an abnormally high defectivity wafer, which has a lot of defect examples for training, sometimes the "normal wafers" (i.e., process of record (POR) wafers) may be defective enough to have a sufficient number of defect examples. In this manner, the training wafer(s) that is or are known to have "abnormally high defectivity" may not need to be created especially for the purposes described herein if there are existing inspection wafer(s) that is or are known to have abnormally high defectivity.

In one embodiment, the at least one training wafer includes at least one wafer on which at least one fabrication process known to cause the abnormally high defectivity on wafers is performed. For example, the at least one training wafer may include an intentionally "skewed" wafer, which may be generated when it is known what kind of wafer processing can increase the defect density on a wafer. The at least one fabrication process may include any suitable fabrication process that can be performed to alter a wafer such as a lithography process, an etch process, a chemical mechanical polishing process, a deposition process, a stripping process, and some combination of these processes. The at least one fabrication process may be known to cause the abnormally high defectivity on wafers in any suitable manner such as based on previously generated inspection results for one or more other wafers. Defect examples detected on such a wafer can then be used to train a learning based defect classifier as described further herein.

In another embodiment, the at least one training wafer includes at least one wafer having one or more materials formed thereon, and the one or more materials are known to cause the abnormally high defectivity to be detected on the at least one training wafer. For example, the at least one training wafer may be created by modifying a wafer such that plenty of defect examples can be found thereon. In one such example of an appropriate modification, one or more additional layers of certain materials may be added to a wafer that is otherwise normally processed. Adding the one or more materials to the at least one wafer may include deposition of a thin film of a material on the wafer(s) that absorbs light used by the defect inspection tool to find defects. Examples of such thin films include, but are not limited to, semiconducting materials or metals. The thickness of such films are usually on the order of a few nanometers to several tens of nanometers. The defect examples detected on such a wafer can then be used to train a learning based defect classifier as described further herein.

In an additional embodiment, the at least one training wafer includes at least one wafer on which at least one fabrication process is performed with one or more parameters of the at least one fabrication process known to be suboptimal. For example, the at least one training wafer may be created by processing a wafer using an older more defective process. One such example of an older more defective process is a semiconductor manufacturing process that was less optimized in terms of defect count. Usually, the optimization of a certain wafer processing step happens over a period of several days or weeks. One starts with a best guess for processing conditions, which one generally knows or guesses from previous processes. Usually, these initial process parameters are relatively close to the final ones, but still produce substantially high defect counts on the wafers so processed. This process that is older by a couple of weeks or days could be used to produce one or more training wafers on which plenty of defect examples can be found and used for training as described further herein.

In a further embodiment, the one or more computer subsystems are configured for artificially creating one or more examples of the DOIs. "Artificially created" defects as that term is used herein can be generally defined as one or more defects purposefully caused on a wafer, e.g., by manipulation of the design information for the wafer, or purposefully caused in images generated for a wafer by an inspection subsystem. Therefore, "artificially created" defects may also be referred to as "hypothetical," "programmed," or "synthetic" defects. For example, the defect examples used for training a learning based defect classifier as described herein may be artificially created by the one or more computer subsystems.

In one such example, the one or more computer subsystems may be configured to create artificial defects in the design data for the inspection wafer. Example defect types that may be artificially created can include: opens, shorts, protrusions, intrusions, etc. An optical or scanning electron microscope (SEM) image can then be generated from the modified design data using generative model(s), which may be configured as described further herein, and these "cartoon-like" defects can be converted into realistic looking defects on an optical or SEM image. In this manner, design data can be used to artificially generate defects (e.g., opens, shorts, protrusions, line ends, metrology markers, etc.) therein and then be treated by a deep generative or other model (to create realistic defects on training images) and/or be used to print the artificially generated defects on one or more wafers, which can then be used to generate images of the artificially generated defects on the wafer(s). The design alteration portion of the work can be automated with a programmable/graphical electron design automation (EDA) editor, which may include any suitable EDA software, hardware, system, or method. Simulating the inspector to generate optical images for the artificially created defects may be performed using a model such as WINsim, which is commercially available from KLA-Tencor, and which can rigorously model the response of an inspector using an electromagnetic (EM) wave solver. Such simulations may be performed for any other imaging subsystems or systems described herein. In addition, such simulations may be performed using any other suitable software, algorithm(s), method(s), or system(s) known in the art.

The computer subsystem(s) are configured for detecting defects on the at least one training wafer and the at least one inspection wafer by applying a defect defection method to the output generated for the at least one training wafer and the at least one inspection wafer, respectively. Detecting defects on the at least one training wafer and at least one inspection wafer may be performed in any suitable manner known in the art (e.g., applying a defect detection threshold to the output and determining that any output having a value above the defect detection threshold corresponds to a defect or a potential defect) with any suitable defect detection method and/or algorithm.

The defects that are detected on the at least one training wafer and the at least one inspection wafer will include different types of defects. The different types of defects will generally include at least some "nuisances" and at least some DOIs. "Nuisances" (which is sometimes used interchangeably with "nuisance defects") as that term is used herein is generally defined as defects that are detected on the wafer as such but are not really actual defects on the wafer. Instead, "nuisances" may be detected as defects due to non-defect noise sources on the wafer (e.g., line edge roughness (LER), relatively small critical dimension (CD) variation in patterned features, thickness variations, etc.) and/or due to marginalities in the inspection subsystem itself or its configuration used for inspection.

The term "DOI" as used herein can be defined as defects that are detected on a wafer and are really actual defects on the wafer. Therefore, the DOIs are of interest to a user because users generally care about how many and what kind of actual defects are on wafers being inspected. In some contexts, the term "DOI" is used to refer to a subset of all of the actual defects on the wafer, which includes only the actual defects that a user cares about. For example, there may be multiple types of DOIs on any given wafer, and one or more of them may be of greater interest to a user than one or more other types. In the context of the embodiments described herein, however, the term "DOIs" is used to refer to any and all real defects on a wafer.

Generally, therefore, the goal of inspection is not to detect nuisances on wafers. Despite substantial efforts to avoid such detection of nuisances, it is practically impossible to eliminate such detection completely. Therefore, it is important to identify which of the detected defects are nuisances and which are DOIs such that the information for the different types of defects can be used separately, e.g., the information for the DOIs may be used to diagnose and/or make changes to one or more fabrication processes performed on the wafer, while the information for the nuisances can be ignored, eliminated, or used to diagnose noise on the wafer and/or marginalities in the inspection process or tool.

The computer subsystem(s) are also configured for identifying DOIs on the at least one training wafer and the at least one inspection wafer by determining which of the defects detected on the at least one training wafer and the at least one inspection wafer, respectively, are the DOIs and identifying nuisances on the at least one training wafer and the at least one inspection wafer by determining which of the defects detected on the at least one training wafer and the at least one inspection wafer, respectively, are the nuisances. The computer subsystem(s) may determine which of the detected defects are the DOIs and the nuisances by selecting a sample of the defects detected on the at least one training wafer and at least one inspection wafer and performing defect classification on the sample of defects. The defect classification may be a ground truth type of defect classification such as acquiring SEM images for the defects and having a user classify the defects based on the SEM images or applying a known good classification method to the acquired images. In general, the one or more computer subsystems may be configured to use any suitable method or system to generate "ground truth" defect classifications for at least a sample of defects on the at least one training wafer and the at least one inspection wafer. In this manner, the DOIs and nuisances on the at least one training wafer and at least one inspection wafer may be identified without uncertainty so that they can be used as described further herein for training a learning based defect classifier.

As described above, therefore, both training wafer(s) and inspection wafer(s) are scanned by the inspection subsystem. Defects are then detected on both types of wafers by the computer subsystem(s), and the different types of defects detected on both types of wafers are identified. One reason why it is important to use both types of wafers (highly defective wafer(s) and normally defective wafer(s)) in the embodiments described herein is that although the highly defective wafer(s) may provide significant numbers of both DOIs and nuisances for training the learning based defect classifier, the at least one inspection wafer allows the training process to deal with the variation from the wafers/procedures described above (i.e., the at least one training wafer having abnormally high defectivity generated in one or more of the manners described above) to the wafer that we finally want to inspect (an inspection wafer). In this manner, it is preferable to have at least one of each type of wafer: at least one highly defective wafer to get a significant number of DOI examples and at least one wafer that is closer in terms of applied processing conditions to the current wafer (or the wafer whose defects will be classified by the defect classifier trained as described herein). As such, the learning based defect classifier is not just trained on the extremely defective wafer but also on a wafer that is substantially similar to the one that will be inspected next. In addition, the wafers used to train the learning based defect classifier may include at least one training or skewed wafer and as many normal or inspection wafers as possible. Therefore, the computer subsystem(s) may be configured for collecting image data of defects on the inspection wafer(s), which are usually limited in number available and/or are hard to find, and collecting images of nuisance examples on the inspection wafer (usually there are plenty).

The one or more computer subsystems are further configured for generating a training set of defects that includes the identified DOIs and the identified nuisances by combining information for the identified DOIs and the identified nuisances. The results of the detecting and identifying steps described above will include examples of DOIs and nuisances on different types of wafers. In particular, the results of the detecting and identifying steps include DOI and nuisance examples on at least one training wafer, which will typically be a wafer with many DOI examples. The results of the detecting and identifying steps also include DOI and nuisance examples on at least one inspection wafer. The one or more computer subsystems then combine all (or a sample of) defect and nuisance examples from the at least one training wafer and the at least one inspection wafer, which are then used to train a learning based defect classifier as described further herein. The defect and nuisance examples may be sampled from all of the DOIs and nuisances detected and identified on the at least one training wafer and the at least one inspection wafer as described further herein.

As with other machine learning methods, therefore, the training set of defects used for training the learning based defect classifier described herein preferably includes positive and negative examples (or "counter examples") that have been verified with SEM or other ground truth methods or systems to be "ground truth" examples for training. Positive examples would be "real defects," and negative examples would be nuisance events.

In some embodiments, generating the training set of defects includes selecting which of the identified DOIs and identified nuisances are included in the training set of defects such that the training set of defects includes two or more of the DOIs identified on the at least one training wafer, two or more of the DOIs identified on the at least one inspection wafer, two or more of the nuisances identified on the at least one training wafer, and two or more of the nuisances identified on the at least one inspection wafer. For example, the one or more computer subsystems may be configured to generate the training set of defects such that the training set includes at least one DOI from both types of wafers (a DOI on a training wafer and a DOI on an inspection wafer) and at least one nuisance from both types of wafers (a nuisance on a training wafer and a nuisance on an inspection wafer). In this manner, the one or more computer subsystems may generate a training set of defects that includes defect and nuisance examples detected and identified on more than one wafer, which may then be used to train the learning based defect classifier as described further herein.

In some instances, however, the one or more computer subsystems are configured for using 1) DOI examples from the high defect density wafer (e.g., a skewed wafer) and 2) nuisance examples on this wafer and the process of record (POR) wafer for training the learning based defect classifier. As such, DOIs from the POR wafer may not be used for the training if, for instance, it is prohibitively difficult to find any DOIs on the at least one inspection wafer. However, in many instances, it will be preferable to include DOIs on the at least one training wafer as well as DOIs on the at least one inspection wafer in the training set of defects to improve the training of the learning based defect classifier for wafer-to-wafer variations in the DOIs.

In another embodiment, generating the training set of defects includes selecting which of the identified DOIs and the identified nuisances are included in the training set of defects such that the training set of defects includes an equal number of the identified DOIs and the identified nuisances. For example, the one or more computer subsystems may be configured for selecting DOI and nuisance events from the at least one training wafer known to have substantially high defect density and the at least one inspection wafer expected to have normal defectivity.

In general, the ratio of number of DOI examples that are detected on the at least one training wafer to the number of nuisance examples detected on the at least one training wafer will be relatively high due to the configuration of the training wafer and/or the one or more processes used to create the at least one training wafer. For example, at least a majority of the defects detected on the at least one training wafer may be DOI and less than a majority of the defects detected on the at least one training wafer may be nuisances. In another example, a ratio of the number of DOIs detected on the training wafer(s) to the number of nuisances detected on the training wafer(s) may be about 2:1 or even greater.

In contrast, the ratio of the number of DOI examples detected on the at least one inspection wafer to the number of nuisance examples detected on the at least one inspection wafer will be relatively low. For example, at least a majority of defects detected on the at least one inspection wafer may be nuisances and less than a majority of the defects detected on the at least one inspection wafer may be DOIs. In another example, a ratio of the number of DOIs detected on the at least one inspection wafer to the number of nuisances detected on the at least one inspection wafer may be about 1:3 or even lower in many cases. The numbers of the different kinds of defects detected on the inspection wafer(s) will be different from the numbers of these kinds of defects detected on the training wafer(s) due to the intended nature of the inspection wafer(s). In particular, since the inspection wafer(s) are expected to have normal defectivity, the number of DOIs on the inspection wafer(s) will be relatively low (e.g., as would be the case for a production wafer or a wafer created by a production worthy fabrication process) while the number of nuisances detected on the inspection wafer(s) can be much higher than the DOIs due to the noise sources on the inspection wafer(s) and/or marginalities in the inspection process.

In this manner, one type of the wafers described herein (e.g., the at least one training wafer) has many more DOI examples, and another type of the wafers described herein (e.g., the at least one inspection wafer) has many more nuisance examples. Sometimes, even the at least one training wafer has more nuisance than DOI examples (but total number of DOI examples on this wafer will simply be much higher than on the inspection wafer(s)). Therefore, due to the different levels of defectivity and nuisance on the different types of wafers used to generate the training set, the selection of the DOIs and nuisances performed by the one or more computer subsystems to generate the training set of defects may not produce a training set that includes a 1:1 ratio of DOIs to nuisances.

If the ratio of total DOI and total nuisance examples is not 1:1, augmentation can be used to roughly achieve this ratio. Augmentation may include modifying the selected defects to replace, add, or eliminate one or more DOIs or nuisances to achieve a 1:1 ratio of DOIs to nuisances. The augmentation may also include sampling more detected defects on one or more of the wafers, identifying them as DOIs or nuisances, and selecting the appropriate defect types to achieve the 1:1 ratio if not enough defect examples of either one type are available after the first selection. If not enough of either defect type can be found and identified on any of the wafers, the one or more computer subsystems may augment the selected DOIs and/or nuisances by artificially creating one or more DOIs and/or nuisances, which may be performed as described further herein.

Having a 1:1 ratio of DOIs to nuisances in the training set is beneficial. To illustrate the benefits of this ratio, consider an extreme example in which the training set includes 99 nuisance and 1 DOI examples. If the learning based defect classifier is trained with this training set, and it classifies all 100 examples as nuisances, it would appear that its performance is pretty good since it classified 99% of the examples correctly. In contrast, if the training set includes a 1:1 ratio of DOI to nuisances, and a learning based defect classifier trained with this training set classified all the defects in the training set as nuisances, the performance of the learning based defect classifier would have a 50% accuracy, which would be considered a substantially poor performance. Therefore, as can be seen from this example, having a training set of defects that includes a 1:1 ratio of DOI examples to nuisance examples is preferable to properly train and characterize a defect classifier, but there are of course ways around it (e.g., anomaly detection, neutralization of bias, introducing a score which penalizes wrong classification more than correct classification, and the like).

In one embodiment, the one or more computer subsystems are configured for identifying one or more locations on the at least one training wafer and the at least one inspection wafer at which none of the defects are detected and adding images generated for the identified one or more locations to the training set of defects as one or more non-defective locations on the at least one training wafer and the at least one inspection wafer. For example, the one or more computer subsystems may be configured for collecting images at several locations on the at least one inspection wafer (and possibly the at least one training wafer) even if there are no defects present at those locations. In particular, the one or more locations may include an x-y location on a wafer without any DOI or nuisance. The information and/or images that are generated for these one or more identified locations and added to the training set of defects can advantageously add information for how wafer characteristics such as reflectivity have changed (or may change) from one wafer to the next and/or how the wafer noise changes from wafer to wafer. In this manner, the embodiments described herein may use any locations of the inspection (non-skewed) wafer (and possibly the training wafer(s)) as nuisance examples in order to train the learning based defect classifier for wafer-to-wafer process variation.

The one or more computer subsystems are further configured for training a learning based defect classifier with the training set of defects. Training the learning based defect classifier may include inputting any of the information generated by the one or more computer subsystems for the training set of defects into the learning based defect classifier. For example, the learning based defect classifier may have multiple channels capable of receiving and handling different types of information. The information that is input to the learning based defect classifier during training may include, for example, test images for the detected defects (images in which the detected defects appear and/or were acquired at the locations of the detected defects), reference images (e.g., images that were used by the one or more computer subsystems to detect the defects on the wafers), mask images (e.g., images generated by applying a mask to the defect images such that the resulting mask images show only the portions of the images corresponding to the detected defects), difference images (e.g., images generated by subtracting a reference image from a test image), design clips (e.g., a relatively small portion of a design for the wafer corresponding to a defect location on the wafer), images from a different optical mode at the same defect locations, any defect attributes determined for the defects by the one or more computer subsystems, and the like. The information for the training set of defects may also include information indicating the type of each detected defect in the training set of defects (e.g., an indication that a detected defect is a DOI or an indication that a detected defect is a nuisance). In the case of a learning based defect classifier that is configured to separate different types of DOI from each other (e.g., as in a multi-class defect classifier rather than just a nuisance filter type of defect classifier), the training set of defects may also include information for what type of DOI each defect is (e.g., a particle defect, a bridging defect, a scratch, etc.).

By inputting all of the available information for the training set of defects into the learning based defect classifier during training, the learning based defect classifier can use any or all of the information and determine which of the information is suitable for separating different types of detected defects from each other. For example, due to the nature of the learning based defect classifier, which is described further herein, the learning based defect classifier can use the inputted information for the training set of defects and the assigned defect classifications to learn which of the information is useful for separating one type of detected defect from another. In some learning based defect classifier embodiments, the defect classifier includes one or more layers that determine features of the inputted information and one or more layers that determine defect classifications based on the determined features. During training then, the learning based defect classifier layers will learn which features of which information inputted to the learning based defect classifier can be used to generate the correct classifications for each of the detected defects.

Therefore, there is advantageously no need to figure out which of the different types of defect information are useful or not. Instead, we can simply feed all of the available information for the training set of defects to the learning based defect classifier during training, and the learning based defect classifier learns which information type(s) help with DOI-nuisance separation and how. If one or more of the types of information are not useful, the learning based defect classifier will learn to ignore these types of information during the training. For example, during set up time, the learning based defect classifiers described herein are provided with the examples of DOIs and nuisances in the training set. The learning based defect classifier figures out the best ways to separate the defect types based on the training set. In this manner, any and all available information for the training set of defects can be fed into the defect classifier, and the defect classifier can learn which types of information are suitable for identifying the nuisances and the DOIs.

In another embodiment, the one or more computer subsystems are configured for detecting defects on other inspection wafers by applying the defect detection method to the output generated for the other inspection wafers and altering one or more parameters of an inspection recipe for the other inspection wafers based on results of applying the trained learning based defect classifier to one or more of the defects detected on the at least one training wafer, the defects detected on the at least one inspection wafer, or the defects detected on the other inspection wafers. The one or more computer subsystems may detect the defects on the other inspection wafers as described further herein. The one or more computer subsystems may also be configured for using the trained learning based defect classifier to find better defect attributes for recipe tuning. For example, for a given set of inspection parameters (e.g., wavelength, aperture, stage speed, polarization, pixel size, etc.), there is one optimized learning based defect classifier. This optimized defect classifier produces a numeric value for every defect and nuisance event (also called attribute). A threshold can be set for this attribute and used for tuning. If, for example, the attribute ranges from −1149 to 11129, a threshold can be set at, say, 10500, which would mean that everything higher than 10500 can be called a DOI whereas everything smaller than that is designated a nuisance.

The embodiments described herein therefore are configured for training a learning based defect classifier using defects detected on different types of wafers. Performing the training using DOIs and nuisances detected on the different types of wafers described herein provides a number of advantages for the embodiments described herein. For example, to setup stable recipes which are less impacted by wafer-to-wafer process variations, defect and nuisance examples are collected on several wafers, their attributes are calculated, and they are used for recipe tuning. This kind of combining several wafers for tuning has been done for non-machine learning approaches only. For machine learning based approaches, the setup has been done on one wafer. Different augmentation approaches have been used to create more DOI examples. However, wafer-to-wafer process variations have not been taken into consideration when creating the trained machine learning network. In addition, having a sufficient number of defect examples to train a learning based defect classifier is substantially difficult (sometimes impossible) and time consuming, especially when there is no pre-knowledge about a certain wafer and the defectiveness is low.

In contrast to the previously used systems and methods for training learning based defect classifiers, the embodiments described herein are able to take wafer-to-wafer process variations into consideration during training because the DOIs and nuisances that are used to train the learning based defect classifier have been detected on different types of wafers known to have different types of defectivity. For example, one advantage of the embodiments described herein is that they improve the setup of nuisance filters by making use of information coming from other wafers/procedures (e.g., the at least one training wafer and possibly the at least one procedure used to create the at least one training wafer). The embodiments described herein also reduce (or even eliminate) the adverse effects of wafer-to-wafer process variations on defect classifiers and nuisance filters by taking into account DOIs, nuisances, and non-defect sites of the inspection wafer. In addition, using DOIs and nuisances detected on different types of wafers known to have different types of defectivity to train a learning based defect classifier advantageously provides a sufficient number of defect examples for the training in a relatively easy and quick manner. In particular, as described further herein, since the training set of defects is generated to include DOIs and nuisances detected on both the wafer having abnormally high defectivity and the wafer having an expected level of normal defectivity, the embodiments described herein advantageously collect sufficient defect examples to train a learning based defect classifier.

The embodiments described herein may train a learning based defect classifier that is configured to perform or be used for different defect-related functions such as defect sampling and nuisance reduction (or suppression), which may be performed in several different manners described further herein. Since the learning based defect classifier is trained as described herein using wafers known to have dramatically different defectivity, the trained learning based defect classifiers described herein will be suitably trained and therefore have improved performance, e.g., accuracy, precision, separability, for defect-related functions performed for wafers having dramatically different $1o$ defectivity. In this manner, the embodiments described herein are capable of achieving improved defect-related functions such as defect sampling and nuisance suppression performed by a learning based defect classifier by training the learning based defect classifier utilizing defects found on other wafers.

The trained learning based defect classifier can be used to improve defect sampling and/or nuisance filtering when applied to the at least one training wafer, the at least one inspection wafer, another inspection wafer or wafers, or some combination thereof. Various ways in which the trained learning based defect classifier can be used are described further herein. In any of the embodiments described herein, the results produced by the defect classifiers described herein may include some indication of whether each defect is classified as a DOI or a nuisance (and in a multi-class classifier, what kind of DOI that a defect classified as a DOI is) and possibly a score (e.g., a DOI score or a nuisance score) for each defect indicating the certainty or probability that each defect has been correctly classified.

In one embodiment, the one or more computer subsystems are configured for applying the trained learning based defect classifier to the defects detected on the at least one training wafer or the at least one inspection wafer and not included in the training set of defects. For example, the one or more computer subsystems may be configured to use the trained learning based defect classifier to run inference on non-classified defects detected on any of the at least one training wafer and the at least one inspection wafer. In such instances, any and/or all of the information that is available for the defects not included in the training set may be input to the trained learning based defect classifier. The trained learning based defect classifier will then generate output indicating if each of the defects, whose information is input to the learning based defect classifier, is a DOI (and possibly what kind of DOI) or a nuisance.

In one such embodiment, the one or more computer subsystems are configured for modifying the trained learning based defect classifier using results of applying the trained learning based defect classifier to the defects detected on the at least one training wafer or the at least one inspection wafer and not included in the training set of defects. For example, newly identified DOI can be added to the training data set to refine the learning based defect classifier and to make it more robust to wafer-to-wafer process variation. In addition, newly identified DOI found during inference on a variety of wafers can be used for refining the trained learning based defect classifier. The improved learning based defect classifier can then be used for further inference runs. Therefore, the trained learning based defect classifier can be periodically updated, which may be performed at predetermined time intervals (e.g., every so many days), after a predetermined number of uses of the trained learning based defect classifier (e.g., after use for a predetermined number of wafers), or any time the user decides that an update is to be performed. In some instances, every time the trained learning based defect classifier is used, any DOIs identified by the trained classifier may be added to the training set and used to tune the learning based defect classifier. In another example, defects that are reviewed (e.g., via SEM) and classified on every scanned wafer can be added to the training set, which can then be used to constantly update the learning based defect classifier (for "active" learning).

In another embodiment, the one or more computer subsystems are configured for detecting defects on another inspection wafer by applying the defect detection method to the output generated for the other inspection wafer and applying the trained learning based defect classifier to the defects detected on the other inspection wafer. For example the one or more computer subsystems may be configured for using the trained learning based defect classifier to run inference on non-classified defects of any other wafers. In this manner, the trained learning based defect classifier may be used by the one or more computer subsystems to classify defects detected on an inspection wafer. Detecting the defects on the other inspection wafer may be performed by the computer subsystem(s) as described further herein. The computer subsystem(s) may apply the trained learning based defect classifier to the defects detected on the other inspection wafer as described further herein.

In one such embodiment, the one or more computer subsystems are configured for modifying the trained learning based defect classifier using results of applying the trained learning based defect classifier to the defects detected on the other inspection wafer. For example, newly identified DOI can be added to the training data set to refine the learning based defect classifier and to make it more robust to wafer-to-wafer process variation. In addition, newly identified DOI found during inference on a variety of wafers can be used for refining the trained learning based defect classifier. The improved learning based defect classifier can then be used for further inference runs. This modification of the trained learning based defect classifier may be performed as described further herein. In this manner, the newly found defects on another inspection wafer (or inspection wafers) may be fed back into the learning based defect classifier and retraining of the learning based defect classifier may be performed using those defects (i.e., in an "active" learning approach) in combination with the original training set of defects.

In some embodiments, the one or more computer subsystems are configured for sampling the defects detected on the at least one training wafer or the at least one inspection wafer based on results generated by the trained learning based defect classifier. For example, the one or more computer subsystems may be configured for using the defect classification results produced by the learning based defect classifier for defect sampling. The defect sampling may be performed in any suitable manner (e.g., random sampling). The defect sampling may be performed to select at least some defects of each type classified by the defect classifier (e.g., at least some of each type of DOI and at least some nuisances) or at least some defects of fewer than all of the types identified by the defect classifier (e.g., at least some DOIs of each type and none of the nuisances). A defect sample generated in this manner may be used for one or more other functions (e.g., verification of the defect classifier training, setting up another nuisance filter, etc.).

In a further embodiment, the one or more computer subsystems are configured for detecting defects on another inspection wafer by applying the defect detection method to the output generated for the other inspection wafer, applying the trained learning based defect classifier to the defects detected on the other inspection wafer, and sampling the defects detected on the other inspection wafer based on results generated by the trained learning based defect classifier for the other inspection wafer. For example, the one or more computer subsystems may be configured for using the defect classification results produced by the learning based defect classifier for defect sampling on any wafer including wafers other than the at least one training wafer and at least one inspection wafer used for training the learning based defect classifier. In addition, the one or more computer subsystems may be configured to use the trained learning based defect classifier to sample defects that have a high likelihood of being DOI on other wafers. These steps may be performed as described further herein.

In one such embodiment, the one or more computer subsystems are configured for creating a defect classifier based on the sampled defects. For example, the learning based defect classifier can be used for defect sampling that can help to find more DOI examples. Those defect examples can then be used to setup a classifier, which may include any type of defect classifier. For example, in one embodiment, the defect classifier is not a learning based type defect classifier. In other words, the defect classifier that is created using the defect sample from the classification results of the deep learning based classifier can be configured for performing defect classification with attributes that are currently on the inspection system (without any newly derived deep learning attributes). As such, the learning based defect classifier may only be used for sampling if one of the existing defect attributes determined by inspection is good enough for defect classification. If there is no attribute that does as good on the process of record wafer, then the learning based defect classifier can be used instead. This defect classifier may be created in any suitable manner known in the art.

In another embodiment, the one or more computer subsystems are configured for detecting defects on other inspection wafers by applying the defect detection method to the output generated for the other inspection wafers, which may be performed as described further herein, setting up a nuisance filter based on results generated by the trained learning based defect classifier, and applying the nuisance filter to information for the defects detected on the other inspection wafers. For example, the one or more computer subsystems may be configured for using the trained learning based defect classifier to set up an improved nuisance filter. The nuisance filter that is set up using the trained learning based defect classifier may include a learning based defect classifier or a non-learning based defect classifier. For example, the results produced by the training of the learning based defect classifier (e.g., the parameters of the trained defect classifier and/or the defect classification results produced by the trained defect classifier) may be used to train any defect classifier, learning based or not. One example of a non-learning based defect classifier is a simple decision tree type defect classifier. A learning based defect classifier trained as described herein may also be used as a mother network. For example, the parameters of the trained classifier can be used as a starting point when applying it to a new dataset, which is generally referred to in the art as transfer learning. In this manner, the trained learning based defect classifier can be used as a starting point for generating a new learning based defect classifier to be used for a different type of inspection wafer.

In an additional embodiment, the trained learning based defect classifier is configured for separating the nuisances from the DOIs, and the one or more computer subsystems are configured for detecting defects on another inspection wafer by applying the defect detection method to the output generated for the other inspection wafer and performing nuisance filtering for the other inspection wafer by inputting information for the defects detected on the other inspection wafer into the trained learning based defect classifier. For example, the one or more computer subsystems may be configured for using the learning based defect classifier itself as a nuisance event filter. Using the trained learning based defect classifier during inspection of other inspection wafers will improve the sensitivity of the inspection to key DOIs, and the embodiments described herein enable setting up nuisance filters faster and better. Finding the key DOIs can save semiconductor manufacturers millions of dollars. The defects may be detected on the other inspection wafer as described further herein. In addition, the information for the defects detected on the other inspection wafer may be input to the trained learning based defect classifier as described further herein.

In a further embodiment, the one or more computer subsystems are configured for inputting information for defects detected on other inspection wafers into the trained learning based defect classifier, and training the learning based defect classifier with the training set of defects reduces wafer-to-wafer variation in performance of the trained learning based defect classifier for the other inspection wafers. For example, as described further herein, using training wafer(s) known to have high defectivity and inspection wafer(s) expected to have normal defectivity to train the learning based defect classifier will make the trained learning based defect classifier more robust and less susceptible to performance variations from wafer-to-wafer due to variations in the wafers. Therefore, when the trained learning based defect classifier is used for other inspection wafers, the performance of the trained learning based defect classifier should not be any different for the other inspection wafers compared to those used for training the defect classifier even if the other inspection wafers have variations that render one or more of their characteristics different from the wafers whose defects were used to train the defect classifier.

In one embodiment, the trained learning based defect classifier is configured for separating the DOIs from the nuisances. In another embodiment, the trained learning based defect classifier is configured for separating the DOIs from the nuisances and for separating different types of the DOIs from each other. For example, although the learning based defect classifiers are referred to herein as defect classifiers, the defect classifiers may only separate DOIs from nuisances, meaning that it assigns an identifier that is either a DOI or a nuisance. Therefore, the defect classifiers may also be referred to as nuisance filters although nuisance filtering is, in of itself, a kind of defect classification (e.g., classifying defects as either DOIs or nuisances). However, the learning based defect classifiers described herein may also be configured for separating different types of DOIs from each other. Therefore, the learning based defect classifier may also be configured for separating nuisances from DOIs as well as different DOIs from each other. In this manner, defects detected on a wafer may be identified as nuisances, a first type of DOI, a second type of DOI, and so on. Therefore, the learning based defect classifier may assign a classification to each of the defects that may be a nuisance classification, a first DOI type classification, a second DOI type classification, etc. The defect classifiers described herein may be configured for either type of defect classification depending on the preference of the user. In this manner, the defect classifiers described herein can be configured for multi-class classification problems as well as the nominal "real" versus "nuisance" filtering applications.

In a further embodiment, the one or more computer subsystems are configured for separating the nuisances from the DOIs in inspection results generated for the at least one training wafer, the at least one inspection wafer, or any other wafer by the one or more computer subsystems. For example, the defects that are identified as nuisances by the trained learning based defect classifier can be eliminated from inspection results completely such that the inspection results only include information for the defects identified as DOIs. However, in some instances, it may be useful to not eliminate the information for the defects identified as nuisances completely. In such instances, the inspection results may include separate files, databases, or other data structures for the defects identified as the nuisances and the defects identified as the DOIs. In this manner, information for the nuisances will be separate from the information for the DOIs which can make using the different information easier. However, in other instances, separating the nuisances from the DOIs in the inspection results does not necessarily include eliminating or separating the information. For example, separating the nuisances from the DOIs can include simply labeling each of the defects as a nuisance or a DOI (e.g., via a classification code) and storing those labels in the inspection results with any other information for the defects generated by inspection and/or the computer subsystem(s) described herein. In this manner, if information for either the nuisances or the DOIs is to be used, the entire inspection results file can simply be filtered or sorted by the labels that have been assigned to the defects. In any of these methods for separating the defects, the information for the nuisances and the DOIs can be easily accessed and used either separately or collectively.

All of the embodiments described herein may include storing results of one or more steps of the embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. to perform one or more functions for the inspection wafer or another wafer of the same type. Such functions include, but are not limited to, altering a process such as a fabrication process or step that was performed on the inspection wafer in a feedback manner, altering a process such as a fabrication process or step that will be performed on the inspection wafer in a feedforward manner, etc.

In one embodiment, the component(s), e.g., component(s) 100 shown in FIG. 1, executed by the computer subsystem(s), e.g., computer subsystem 36 and/or computer subsystem(s) 102, include learning based defect classifier 104. The learning based defect classifier is configured for classifying defects detected on wafers. Although the learning based defect classifier is generally referred to herein as a "defect classifier," the learning based defect classifier can also be referred to as a nuisance filter if the main purpose for which it will be configured is for separating nuisances from DOIs. Since separating nuisances from DOIs can, in of itself, be considered a kind of defect classifying, the learning based defect classifier that is configured for such separating is generally referred to herein as a defect classifier. The learning based defect classifier may be further configured as described herein. In this manner, the defect classifiers described herein can be configured for multi-class classification problems as well as the nominal "real" versus "nuisance" filtering applications.

The configuration of the learning based defect classifier may be selected based on the type of information that will be input into it. For example, if only the attributes of the detected defects (e.g., defect/nuisance attributes such as signal-to-noise value, background grey level, difference grey level, shape, size, etc.) will be used for defect classification, then a machine learning method such as a random forest decision tree, logistic regression method, etc. may be used as the learning based defect classifier.

Figure 3:
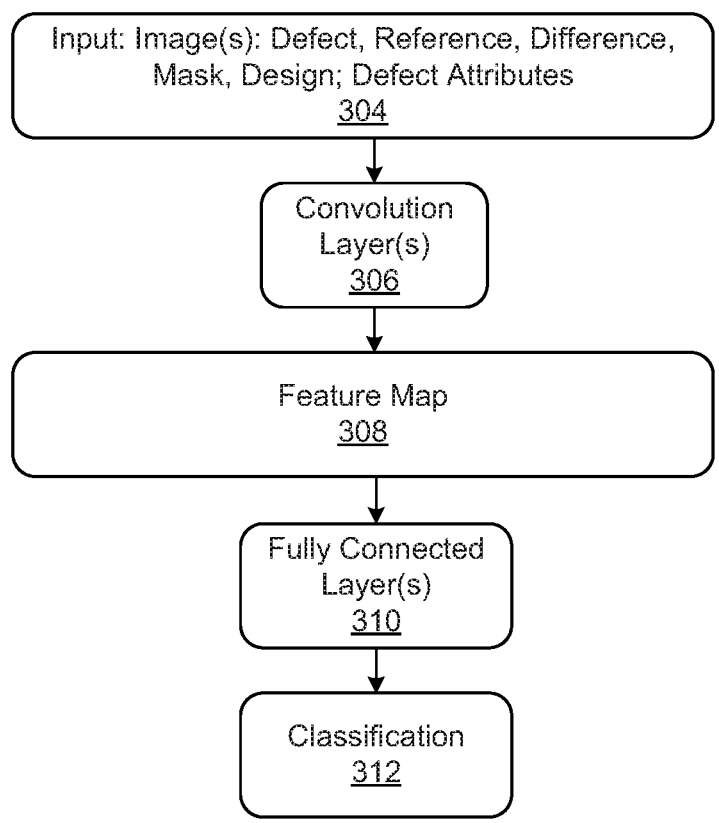
FIG. 3 is a flow diagram illustrating one embodiment of a learning based defect classifier configured as described herein.

In one embodiment, the learning based defect classifier includes a convolutional neural network (CNN). Such a classifier configuration may be selected when one or more of the inputs to the classifier includes one or more of the image types described herein. FIG. 3 shows one embodiment of a learning based model that may be used as the learning based defect classifier in the embodiments described herein. The learning based model includes a first portion configured for determining features of input for a wafer generated by an inspection subsystem or a computer subsystem coupled to the inspection subsystem. For example, as shown in FIG. 3, a first portion of the learning based model includes, in one embodiment, convolution layer(s) 306 that determine features (e.g., feature map 308) of input 304, which includes image(s), which may include at least defect images and possibly also one or more of reference, difference, and mask images and design, and any other information described herein such as defect attributes determined by the computer subsystem(s) based on the output generated by the detector(s).

The convolution layer(s) included in the first portion of the learning based defect classifier may have any suitable configuration known in the art and are generally configured to determine features for an image as a function of position across the image (i.e., a feature map) by applying a convolution function to the input image using one or more filters. In this manner, the first portion of the learning based defect classifier may be configured as a CNN, which is usually stacks of convolution and pooling layers, to extract local features. The embodiments described herein can take advantage of deep learning concepts such as a CNN to solve the normally intractable representation inversion problem. The first portion may have any CNN configuration or architecture known in the art. The one or more pooling layers may also have any suitable configuration known in the art (e.g., max pooling layers) and are generally configured for reducing the dimensionality of the feature map generated by the one or more convolution layers while retaining the most important features.

The features determined by the first portion of the learning based defect classifier may include any suitable features that can be inferred from the input and used to generate the output described further herein. For example, the features may include a vector of intensity values per pixel. The features may also include vectors of scalar values, vectors of independent distributions, joint distributions, or any other suitable feature types known in the art.

The learning based model also includes a second portion configured for classifying the defects detected on the wafer based on the determined features. For example, as shown in FIG. 3, a second portion of the learning based model includes, in one embodiment, fully connected layer(s) 310. As further shown in FIG. 3, the input to fully connected layer(s) 310 is the determined features, e.g., feature map 308, and the output of fully connected layer(s) 310 is classification 312. Therefore, fully connected layer(s) 310 may be included in the second portion and may be configured for defect classification.

The one or more fully connected layers are configured for selecting one or more of the determined features and classifying the defects based on the one or more selected features. A "fully connected layer" may be generally defined as a layer in which each of the nodes is connected to each of the nodes in the previous layer. The fully connected layer(s) select features from feature map 308 and then classify the defects based on the selected features. The selected features may include all of the features in the feature map (if appropriate) or only some of the features in the feature map. The fully connected layers may be followed by a SoftMax layer (not shown), which may be configured to produce a defect classification for each defect based on the output generated by the fully connected layer(s). The SoftMax layer may have any suitable configuration known in the art. The learning based defect classifier outputs classification 312, which may include a classification result per defect with a confidence associated with each classification result. The results of the classification can also be used as described further herein. The classification may have any suitable format (such as a defect ID, a defect description such as "pattern," "bridge," etc.). The classification results may be stored and used as described further herein.

In one embodiment, the learning based defect classifier is configured as a deep learning model. Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep learning based model, there are many layers between the input and output (and the layers are not made of neurons but it can help to think of it that way), allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

In another embodiment, the learning based defect classifier is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if fully set forth herein. The embodiments described herein may be further configured as described in these references.

In some embodiments, the learning based defect classifier is a generative model. A "generative" model can be generally defined as a model that is probabilistic in nature. In other words, a "generative" model is not one that performs forward simulation or rule-based approaches. Instead, the generative model can be learned (in that its parameters can be learned) based on a suitable training set of data. In one embodiment, the learning based defect classifier is configured as a deep generative model. For example, the learning based defect classifier may be configured to have a deep learning architecture in that the defect classifier may include multiple layers, which perform a number of algorithms or transformations.

In a further embodiment, the learning based defect classifier may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the learning based defect classifier is configured as an AlexNet. In general, an AlexNet includes a number of convolution layers (e.g., 5) followed by a number of fully connected layers (e.g., 3) that are, in combination, configured and trained to classify images. Examples of neural networks configured as AlexNets are described in "ImageNet Classification with Deep Convolutional Neural Networks" by Krizhevsky et al., NIPS 2012, which is incorporated by reference as if fully set forth herein. The learning based defect classifiers described herein may be further configured as described in this reference.

In another embodiment, the learning based defect classifier is configured as a GoogleNet. A GoogleNet may include layers such as convolutional, pooling, and fully connected layers configured and trained to classify images. While the GoogleNet architecture may include a relatively high number of layers (especially compared to some other neural networks described herein), some of the layers may be operating in parallel, and groups of layers that function in parallel with each other are generally referred to as inception modules. Others of the layers may operate sequentially. Therefore, a GoogleNet is different from other neural networks described herein in that not all of the layers are arranged in a sequential structure. Examples of neural networks configured as GoogleNets are described in "Going Deeper with Convolutions," by Szegedy et al., CVPR 2015, which is incorporated by reference as if fully set forth herein. The learning based defect classifiers described herein may be further configured as described in this reference.

In a further embodiment, the learning based defect classifier is configured as a VGG network. VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to classify images. VGG networks also include convolutional layers followed by fully connected layers. Examples of neural networks configured as VGG are described in "Very Deep Convolutional Networks for Large-Scale Image Recognition," by Simonyan et al., ICLR 2015, which is incorporated by reference as if fully set forth herein. The learning based defect classifiers described herein may be further configured as described in this reference.

In some embodiments, the learning based defect classifier is configured as a deep residual network or a Deep Residual Net. Like some other learning based defect classifiers described herein, a deep residual network may include convolutional layers followed by fully connected layers, which are, in combination, configured and trained for image classification. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart. Examples of deep residual nets are described in "Deep Residual Learning for Image Recognition" by He et al., NIPS 2015, which is incorporated by reference as if fully set forth herein. The learning based defect classifiers described herein may be further configured as described in this reference.

FIG. 3 shows the defect classifier architecture in a fully trained mode (i.e., the learning based defect classifier has already been trained) with the inputs that may be provided to the learning based defect classifier for runtime or production mode. Examples of how the learning based defect classifier may be trained can be found in commonly assigned U.S. patent application Ser. No. 15/697,426 filed Sep. 6, 2017 by He et al., which is incorporated by reference as if fully set forth herein. The embodiments described herein may be further configured as described in this patent application.

The computer subsystem(s) described herein may be further configured for single image detection as described in U.S. Patent Application Publication No. 2017/0140524 published May 18, 2017 by Karsenti et al., which is incorporated by reference as if fully set forth herein. The embodiments described herein may be further configured for performing transformations (from an input image to a simulated image) such as those described in commonly owned U.S. Patent Application Publication Nos. 2017/0140524 published May 18, 2017 by Karsenti et al., 2017/0148226 published May 25, 2017 by Zhang et al., 2017/0193400 published Jul. 6, 2017 by Bhaskar et al., 2017/0193680 published Jul. 6, 2017 by Zhang et al., 2017/0194126 published Jul. 6, 2017 by Bhaskar et al., 2017/0200260 published Jul. 13, 2017 by Bhaskar et al., 2017/0200264 published Jul. 13, 2017 by Park et al., 2017/0200265 published Jul. 13, 2017 by Bhaskar et al., and 2017/0345140 published Nov. 30, 2017 by Zhang et al., which are incorporated by reference as if fully set forth herein. The embodiments described herein may be further configured as described in these patent application publications. In addition, the embodiments described herein may be configured to perform any steps described in these patent application publications.

Each of the embodiments of the system may be further configured according to any other embodiment(s) described herein.

Another embodiment relates to a computer-implemented method for training a learning based defect classifier. The method includes steps for each of the functions of the computer subsystem(s) described above. The inspection subsystem is configured as described herein.

Each of the steps of the method may be performed as described further herein. The method may also include any other step(s) that can be performed by the inspection subsystem, computer subsystem(s), and/or system(s) described herein. The steps of the method are performed by one or more computer subsystems, which may be configured according to any of the embodiments described herein. In addition, the method described above may be performed by any of the system embodiments described herein.

Figure 4:
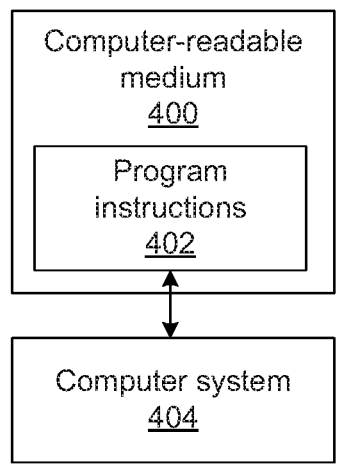
FIG. 4 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for training a learning based defect classifier. One such embodiment is shown in FIG. 4. In particular, as shown in FIG. 4, non-transitory computer-readable medium 400 includes program instructions 402 executable on computer system 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 404 may be configured according to any of the embodiments described herein.

Further modifications and alternative embodiments of various aspects of the invention will be apparent to those skilled in the art in view of this description. For example, methods and systems for training a learning based defect classifier are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to train a learning based defect classifier, comprising:
an inspection subsystem comprising at least an energy source and a detector, wherein the energy source is configured to generate energy that is directed to wafers, wherein the detector is configured to detect energy from the wafers and to generate output responsive to the detected energy, and wherein the wafers comprise at least one training wafer known to have an abnormally high defectivity and at least one inspection wafer expected to have normal defectivity; and
one or more computer subsystems configured for:
detecting defects on the at least one training wafer and the at least one inspection wafer by applying a defect detection method to the output generated for the at least one training wafer and the at least one inspection wafer, respectively;
identifying defects of interest on the at least one training wafer and the at least one inspection wafer by determining which of the defects detected on the at least one training wafer and the at least one inspection wafer, respectively, are the defects of interest;
identifying nuisances on the at least one training wafer and the at least one inspection wafer by determining which of the defects detected on the at least one training wafer and the at least one inspection wafer, respectively, are the nuisances;
generating a training set of defects comprising the identified defects of interest and the identified nuisances by combining information for the identified defects of interest and the identified nuisances;
identifying one or more locations on the at least one training wafer and the at least one inspection wafer at which none of the defects are detected;
adding images generated for the identified one or more locations to the training set of defects as one or more non-defective locations on the at least one training wafer and the at least one inspection wafer; and
training a learning based defect classifier with the training set of defects.

2. The system of claim 1, wherein the at least one training wafer and the at least one inspection wafer are formed using the same one or more fabrication processes except that the same one or more fabrication processes have produced the abnormally high defectivity on the at least one training wafer.

3. The system of claim 1, wherein the at least one training wafer comprises at least one wafer on which at least one fabrication process known to cause the abnormally high defectivity on wafers is performed.

4. The system of claim 1, wherein the at least one training wafer comprises at least one wafer having one or more materials formed thereon, and wherein the one or more materials are known to cause the abnormally high defectivity to be detected on the at least one training wafer.

5. The system of claim 1, wherein the at least one training wafer comprises at least one wafer on which at least one fabrication process is performed with one or more parameters of the at least one fabrication process known to be suboptimal.

6. The system of claim 1, wherein the one or more computer subsystems are further configured for artificially creating one or more examples of the defects of interest.

7. The system of claim 1, wherein said generating comprises selecting which of the identified defects of interest and the identified nuisances are included in the training set of defects such that the training set of defects comprises two or more of the defects of interest identified on the at least one training wafer, two or more of the defects of interest identified on the at least one inspection wafer, two or more of the nuisances identified on the at least one training wafer, and two or more of the nuisances identified on the at least one inspection wafer.

8. The system of claim 1, wherein said generating comprises selecting which of the identified defects of interest and the identified nuisances are included in the training set of defects such that the training set of defects comprises an equal number of the identified defects of interest and the identified nuisances.

9. The system of claim 1, wherein the one or more computer subsystems are further configured for applying the trained learning based defect classifier to the defects detected on the at least one training wafer or the at least one inspection wafer and not included in the training set of defects.

10. The system of claim 9, wherein the one or more computer subsystems are further configured for modifying the trained learning based defect classifier using results of applying the trained learning based defect classifier to the defects detected on the at least one training wafer or the at least one inspection wafer and not included in the training set of defects.

11. The system of claim 1, wherein the one or more computer subsystems are further configured for detecting defects on another inspection wafer by applying the defect detection method to the output generated for the other inspection wafer and applying the trained learning based defect classifier to the defects detected on the other inspection wafer.

12. The system of claim 11, wherein the one or more computer subsystems are further configured for modifying the trained learning based defect classifier using results of applying the trained learning based defect classifier to the defects detected on the other inspection wafer.

13. The system of claim 1, wherein the one or more computer subsystems are further configured for sampling the defects detected on the at least one training wafer or the at least one inspection wafer based on results generated by the trained learning based defect classifier.

14. The system of claim 1, wherein the one or more computer subsystems are further configured for detecting defects on another inspection wafer by applying the defect detection method to the output generated for the other inspection wafer, applying the trained learning based defect classifier to the defects detected on the other inspection wafer, and sampling the defects detected on the other inspection wafer based on results generated by the trained learning based defect classifier for the other inspection wafer.

15. The system of claim 14, wherein the one or more computer subsystems are further configured for creating another defect classifier based on the sampled defects.

16. The system of claim 15, wherein the other defect classifier is not a learning based type defect classifier.

17. The system of claim 1, wherein the one or more computer subsystems are further configured for detecting defects on other inspection wafers by applying the defect detection method to the output generated for the other inspection wafers, setting up a nuisance filter based on results generated by the trained learning based defect classifier, and applying the nuisance filter to information for the defects detected on the other inspection wafers.

18. The system of claim 1, wherein the trained learning based defect classifier is configured for separating the nuisances from the defects of interest, and wherein the one or more computer subsystems are further configured for detecting defects on another inspection wafer by applying the defect detection method to the output generated for the other inspection wafer and performing nuisance filtering for the other inspection wafer by inputting information for the defects detected on the other inspection wafer into the trained learning based defect classifier.

19. The system of claim 1, wherein the one or more computer subsystems are further configured for inputting information for defects detected on other inspection wafers into the trained learning based defect classifier, and wherein training the learning based defect classifier with the training set of defects reduces wafer-to-wafer variation in performance of the trained learning based defect classifier for the other inspection wafers.

20. The system of claim 1, wherein the trained learning based defect classifier is configured for separating the defects of interest from the nuisances.

21. The system of claim 1, wherein the trained learning based defect classifier is configured for separating the defects of interest from the nuisances and for separating different types of the defects of interest from each other.

22. The system of claim 1, wherein the one or more computer subsystems are further configured for detecting defects on other inspection wafers by applying the defect detection method to the output generated for the other inspection wafers and altering one or more parameters of an inspection recipe for the other inspection wafers based on results of applying the trained learning based defect classifier to one or more of the defects detected on the at least one training wafer, the defects detected on the at least one inspection wafer, or the defects detected on the other inspection wafers.

23. The system of claim 1, wherein the learning based defect classifier comprises a convolutional neural network.

24. The system of claim 1, wherein the inspection subsystem is configured as an optical inspection subsystem.

25. The system of claim 1, wherein the inspection subsystem is configured as an electron beam inspection system.

26. A non-transitory computer-readable medium, storing program instructions executable on a computer system for performing a computer-implemented method for training a learning based defect classifier, wherein the computer-implemented method comprises:
   detecting defects on at least one training wafer and at least one inspection wafer by applying a defect detection method to output generated for the at least one training wafer and the at least one inspection wafer, respectively, by a detector of an inspection subsystem, wherein the at least one training wafer is known to have an abnormally high defectivity, wherein the at least one inspection wafer is expected to have normal defectivity, wherein the inspection subsystem comprises at least an energy source and the detector, wherein the energy source is configured to generate energy that is directed to the wafer, and wherein the detector is configured to detect energy from the wafer and to generate the output responsive to the detected energy;
   identifying defects of interest on the at least one training wafer and the at least one inspection wafer by determining which of the defects detected on the at least one training wafer and the at least one inspection wafer, respectively, are the defects of interest;
   identifying nuisances on the at least one training wafer and the at least one inspection wafer by determining which of the defects detected on the at least one training wafer and the at least one inspection wafer, respectively, are the nuisances;
   generating a training set of defects comprising the identified defects of interest and the identified nuisances by combining information for the identified defects of interest and the identified nuisances; and
   training a learning based defect classifier with the training set of defects.

27. A computer-implemented method for training a learning based defect classifier, comprising:
   detecting defects on at least one training wafer and at least one inspection wafer by applying a defect detection method to output generated for the at least one training wafer and the at least one inspection wafer, respectively, by a detector of an inspection subsystem, wherein the at least one training wafer is known to have an abnormally high defectivity, wherein the at least one inspection wafer is expected to have normal defectivity, wherein the inspection subsystem comprises at least an energy source and the detector, wherein the energy source is configured to generate energy that is directed to the wafer, and wherein the detector is configured to detect energy from the wafer and to generate the output responsive to the detected energy;

identifying defects of interest on the at least one training wafer and the at least one inspection wafer by determining which of the defects detected on the at least one training wafer and the at least one inspection wafer, respectively, are the defects of interest;

identifying nuisances on the at least one training wafer and the at least one inspection wafer by determining which of the defects detected on the at least one training wafer and the at least one inspection wafer, respectively, are the nuisances;

generating a training set of defects comprising the identified defects of interest and the identified nuisances by combining information for the identified defects of interest and the identified nuisances; and training a learning based defect classifier with the training set of defects, wherein said detecting, said identifying the defects of interest, said identifying the nuisances, said generating, and said training are performed by one or more computer subsystems coupled to the inspection subsystem.

28. The method of claim 27, wherein the at least one training wafer and the at least one inspection wafer are formed using the same one or more fabrication processes except that the same one or more fabrication processes have produced the abnormally high defectivity on the at least one training wafer.

29. The method of claim 27, wherein the at least one training wafer comprises at least one wafer on which at least one fabrication process known to cause the abnormally high defectivity on wafers is performed.

30. The method of claim 27, wherein the at least one training wafer comprises at least one wafer having one or more materials formed thereon, and wherein the one or more materials are known to cause the abnormally high defectivity to be detected on the at least one training wafer.

31. The method of claim 27, wherein the at least one training wafer comprises at least one wafer on which at least one fabrication process is performed with one or more parameters of the at least one fabrication process known to be suboptimal.

32. The method of claim 27, wherein the one or more computer subsystems are further configured for artificially creating one or more examples of the defects of interest.

33. The method of claim 27, further comprising identifying one or more locations on the at least one training wafer and the at least one inspection wafer at which none of the defects are detected and adding images generated for the identified one or more locations to the training set of defects as one or more non-defective locations on the at least one training wafer and the at least one inspection wafer.

34. The method of claim 27, wherein said generating comprises selecting which of the identified defects of interest and the identified nuisances are included in the training set of defects such that the training set of defects comprises two or more of the defects of interest identified on the at least one training wafer, two or more of the defects of interest identified on the at least one inspection wafer, two or more of the nuisances identified on the at least one training wafer, and two or more of the nuisances identified on the at least one inspection wafer.

35. The method of claim 27, wherein said generating comprises selecting which of the identified defects of interest and the identified nuisances are included in the training set of defects such that the training set of defects comprises an equal number of the identified defects of interest and the identified nuisances.

36. The method of claim 27, further comprising applying the trained learning based defect classifier to the defects detected on the at least one training wafer or the at least one inspection wafer and not included in the training set of defects.

37. The method of claim 36, further comprising modifying the trained learning based defect classifier using results of applying the trained learning based defect classifier to the defects detected on the at least one training wafer or the at least one inspection wafer and not included in the training set of defects.

38. The method of claim 27, further comprising detecting defects on another inspection wafer by applying the defect detection method to the output generated for the other inspection wafer and applying the trained learning based defect classifier to the defects detected on the other inspection wafer.

39. The method of claim 38, further comprising modifying the trained learning based defect classifier using results of applying the trained learning based defect classifier to the defects detected on the other inspection wafer.

40. The method of claim 27, further comprising sampling the defects detected on the at least one training wafer or the at least one inspection wafer based on results generated by the trained learning based defect classifier.

41. The method of claim 27, further comprising detecting defects on another inspection wafer by applying the defect detection method to the output generated for the other inspection wafer, applying the trained learning based defect classifier to the defects detected on the other inspection wafer, and sampling the defects detected on the other inspection wafer based on results generated by the trained learning based defect classifier for the other inspection wafer.

42. The method of claim 41, further comprising creating another defect classifier based on the sampled defects.

43. The method of claim 42, wherein the other defect classifier is not a learning based type defect classifier.

44. The method of claim 27, further comprising detecting defects on other inspection wafers by applying the defect detection method to the output generated for the other inspection wafers, setting up a nuisance filter based on results generated by the trained learning based defect classifier, and applying the nuisance filter to information for the defects detected on the other inspection wafers.

45. The method of claim 27, wherein the trained learning based defect classifier is configured for separating the nuisances from the defects of interest, and wherein the method further comprises detecting defects on another inspection wafer by applying the defect detection method to the output generated for the other inspection wafer and performing nuisance filtering for the other inspection wafer by inputting information for the defects detected on the other inspection wafer into the trained learning based defect classifier.

46. The method of claim 27, further comprising inputting information for defects detected on other inspection wafers into the trained learning based defect classifier, and wherein training the learning based defect classifier with the training set of defects reduces wafer-to-wafer variation in performance of the trained learning based defect classifier for the other inspection wafers.

47. The method of claim 27, wherein the trained learning based defect classifier is configured for separating the defects of interest from the nuisances.

48. The method of claim 27, wherein the trained learning based defect classifier is configured for separating the defects of interest from the nuisances and for separating different types of the defects of interest from each other.

49. The method of claim 27, further comprising detecting defects on other inspection wafers by applying the defect detection method to the output generated for the other inspection wafers and altering one or more parameters of an inspection recipe for the other inspection wafers based on results of applying the trained learning based defect classifier to one or more of the defects detected on the at least one training wafer, the defects detected on the at least one inspection wafer, or the defects detected on the other inspection wafers.

50. The method of claim 27, wherein the learning based defect classifier comprises a convolutional neural network.

51. The method of claim 27, wherein the inspection subsystem is configured as an optical inspection subsystem.

52. The method of claim 27, wherein the inspection subsystem is configured as an electron beam inspection system.

* * * * *